(12) United States Patent
Molnar

(10) Patent No.: US 10,414,229 B2
(45) Date of Patent: Sep. 17, 2019

(54) LEAF SPRING SYSTEM

(75) Inventor: John Molnar, Logan City (AU)

(73) Assignee: Sax Suspension Technology Pty LTD., Underwood (AU)

( * ) Notice: Subject to any disclaimer, the term of this patent is extended or adjusted under 35 U.S.C. 154(b) by 3 days.

(21) Appl. No.: 13/979,562

(22) PCT Filed: Jan. 13, 2012

(86) PCT No.: PCT/AU2012/000025
§ 371 (c)(1),
(2), (4) Date: Oct. 9, 2013

(87) PCT Pub. No.: WO2012/094710
PCT Pub. Date: Jul. 19, 2012

(65) Prior Publication Data
US 2014/0027961 A1    Jan. 30, 2014

(30) Foreign Application Priority Data

Jan. 13, 2011 (AU) ................................ 2011900106

(51) Int. Cl.
| | |
|---|---|
| *B60G 11/02* | (2006.01) |
| *F16F 1/22* | (2006.01) |
| *F16F 1/26* | (2006.01) |
| *B21D 53/88* | (2006.01) |
| *F16F 1/18* | (2006.01) |

(52) U.S. Cl.
CPC ............ *B60G 11/02* (2013.01); *B21D 53/886* (2013.01); *F16F 1/18* (2013.01); *F16F 1/22* (2013.01); *F16F 1/26* (2013.01); *B60G 2204/121* (2013.01); *Y10T 29/49609* (2015.01)

(58) Field of Classification Search
CPC ... B60G 11/02; B60G 11/04; B60G 2202/112; B60G 17/023; F16F 1/18; F16F 1/185; F16F 1/22; F16F 1/26; F16F 1/027; F16F 1/368; F16F 1/3683; F16F 1/3686; F16F 3/023; F16F 15/073
USPC .......................................................... 267/48
See application file for complete search history.

(56) References Cited

U.S. PATENT DOCUMENTS

| | | | | |
|---|---|---|---|---|
| 1,113,941 A | * | 10/1914 | Andersen ............... | B60G 11/04 267/45 |
| 1,125,199 A | | 1/1915 | Sprague | |
| 1,199,019 A | | 9/1916 | Obrecht | |
| 1,362,037 A | * | 12/1920 | Peterson ............. | B60G 17/023 267/45 |
| 1,436,012 A | * | 11/1922 | Cesak ........................ | F16F 1/24 267/50 |
| 1,579,797 A | * | 4/1926 | Sorensen ............... | B60G 11/02 236/1 R |
| 1,640,778 A | * | 8/1927 | Laher ..................... | B60G 11/04 267/45 |

(Continued)

FOREIGN PATENT DOCUMENTS

| | | | | |
|---|---|---|---|---|
| GB | 221247 | | 9/1924 | |
| JP | 02209637 A | * | 8/1990 | |
| WO | WO 0246640 A2 | * | 6/2002 | ................ F16F 1/22 |

*Primary Examiner* — Bradley T King
*Assistant Examiner* — Stephen M Bowes
(74) *Attorney, Agent, or Firm* — Holland & Hart LLP

(57) ABSTRACT

The invention provides a leaf spring system which supports a leaf spring assembly using attachment mechanisms which allows normal operation of the leaf spring assembly while providing support through a resilient deformable reinforcing spring.

13 Claims, 11 Drawing Sheets

(56) References Cited

U.S. PATENT DOCUMENTS

| | | | | |
|---|---|---|---|---|
| 1,747,727 A | * | 2/1930 | Monteith | F16F 1/22 267/48 |
| 1,854,442 A | * | 4/1932 | Baird | F16F 1/22 267/48 |
| 3,039,759 A | | 6/1962 | Paller | |
| 3,392,971 A | * | 7/1968 | Herbenar | B60G 7/02 267/268 |
| 5,035,406 A | * | 7/1991 | Sellers | B60G 11/10 267/265 |
| 5,971,654 A | * | 10/1999 | Sweeney, Jr. | B60G 9/003 280/686 |
| 2010/0320658 A1 | * | 12/2010 | Mueller | B60G 11/36 267/151 |

* cited by examiner

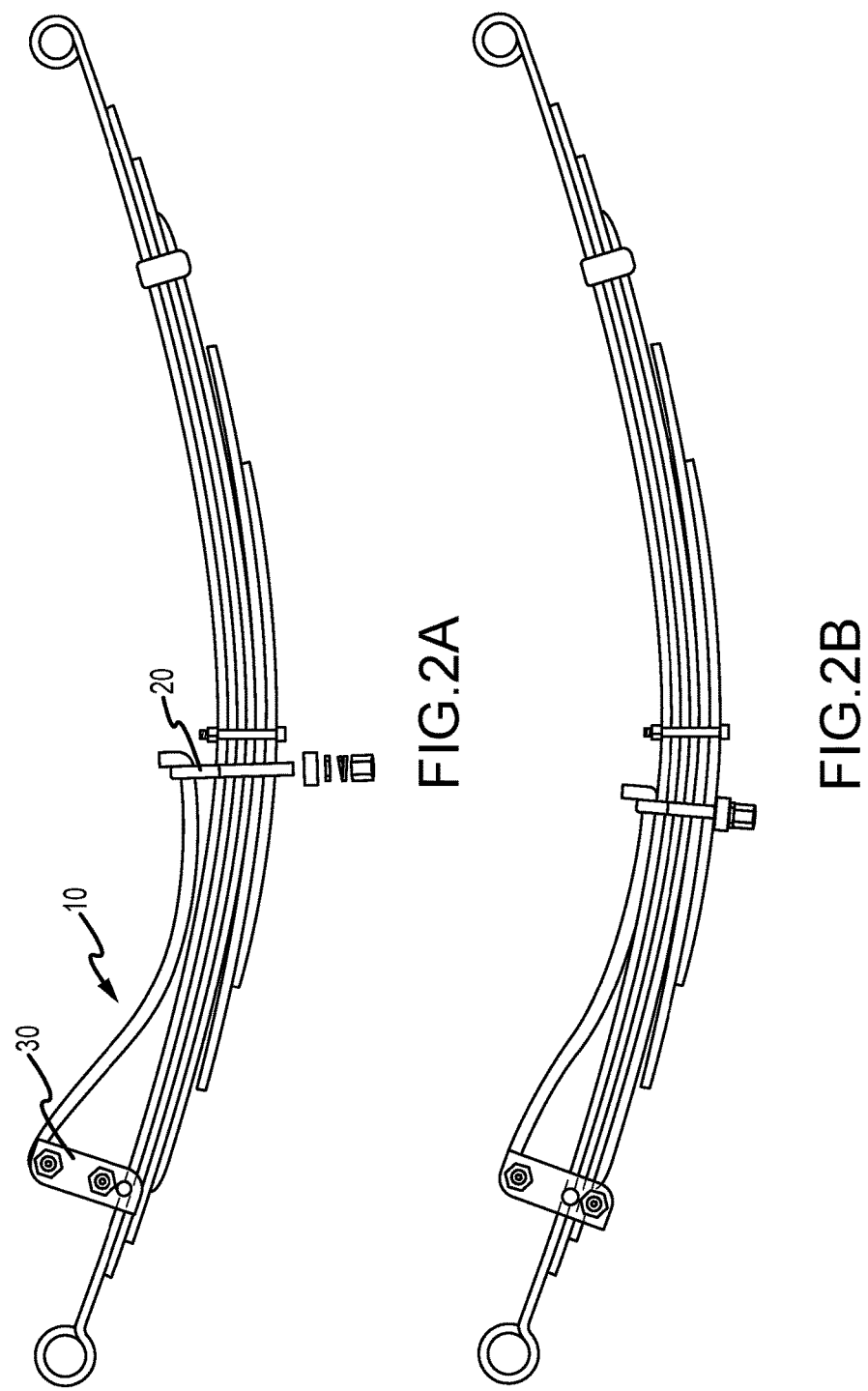

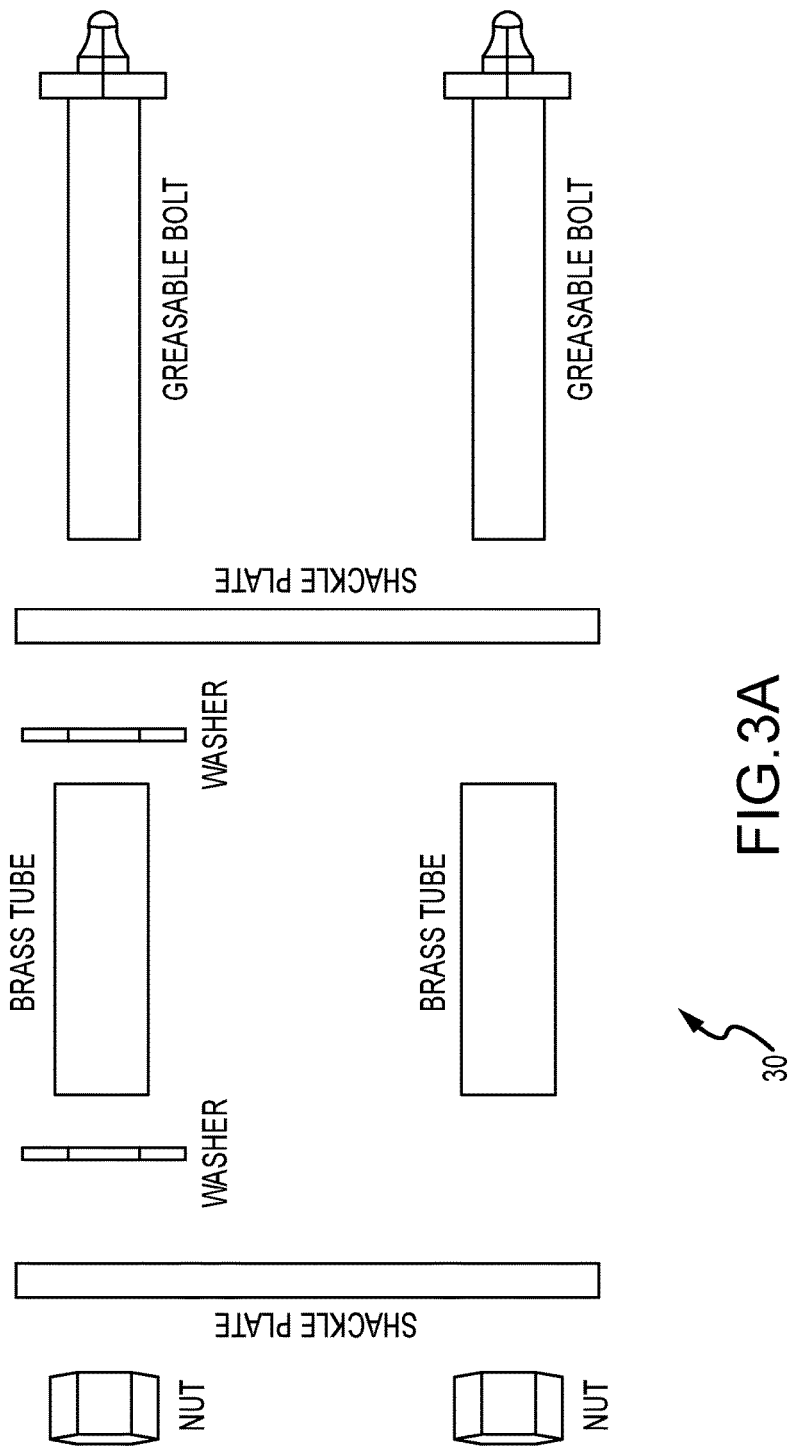

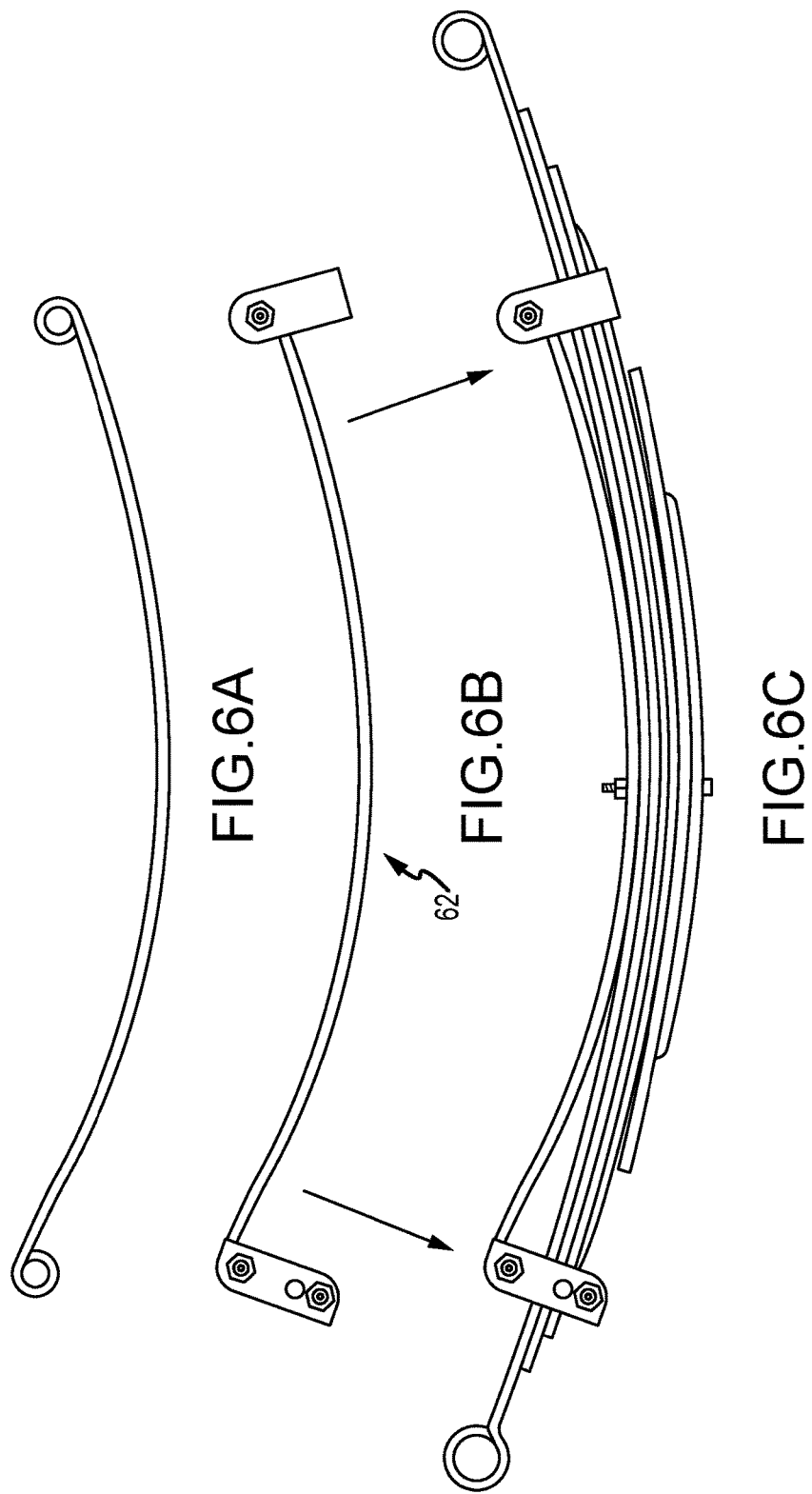

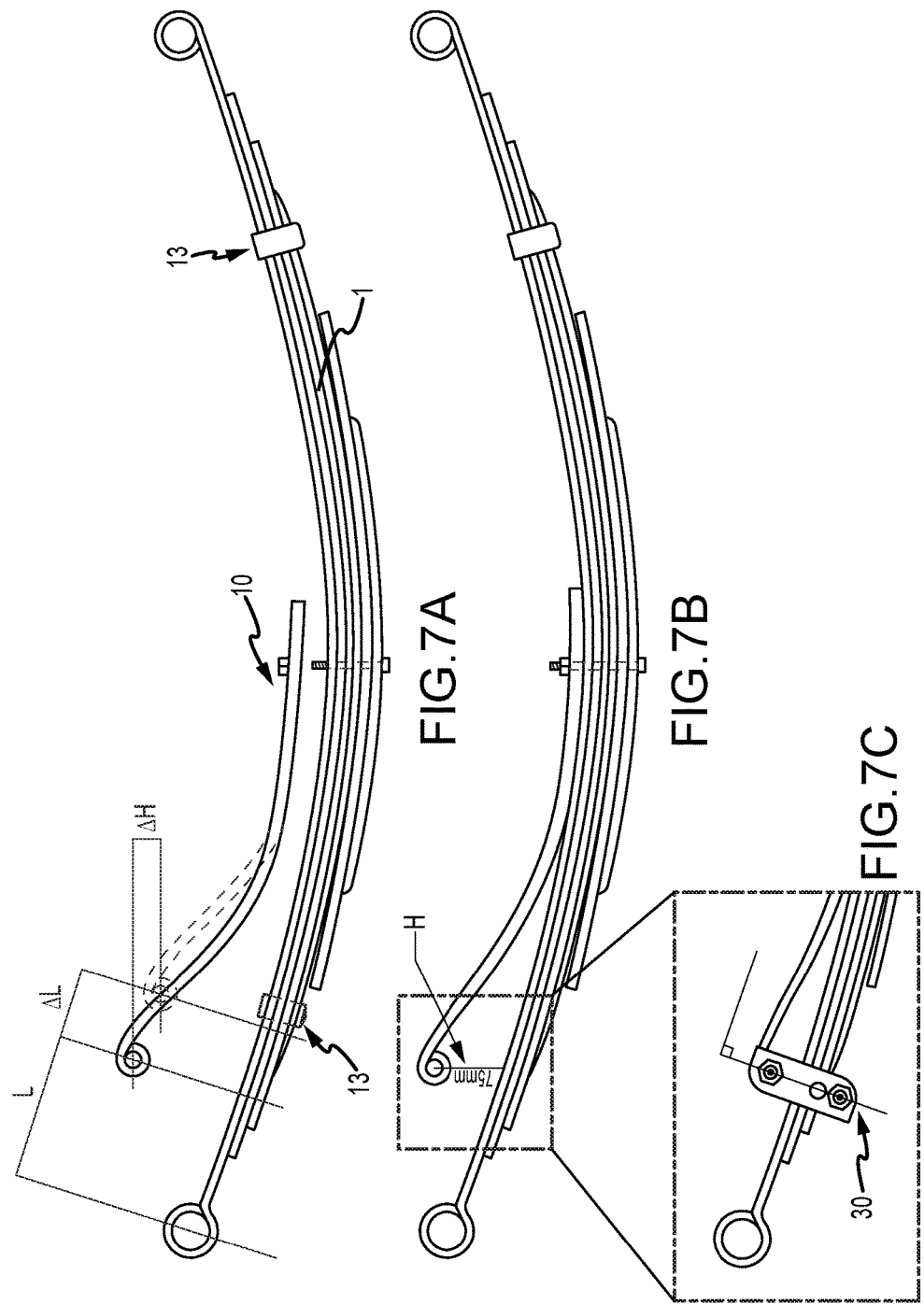

OBJECTIVE:
TO MINIMISE DISTORTION ON THE FRONT OF THE
LEAF SPRING AND DISTRIBUTE WEIGHT
DISPLACEMENT EQUALLY

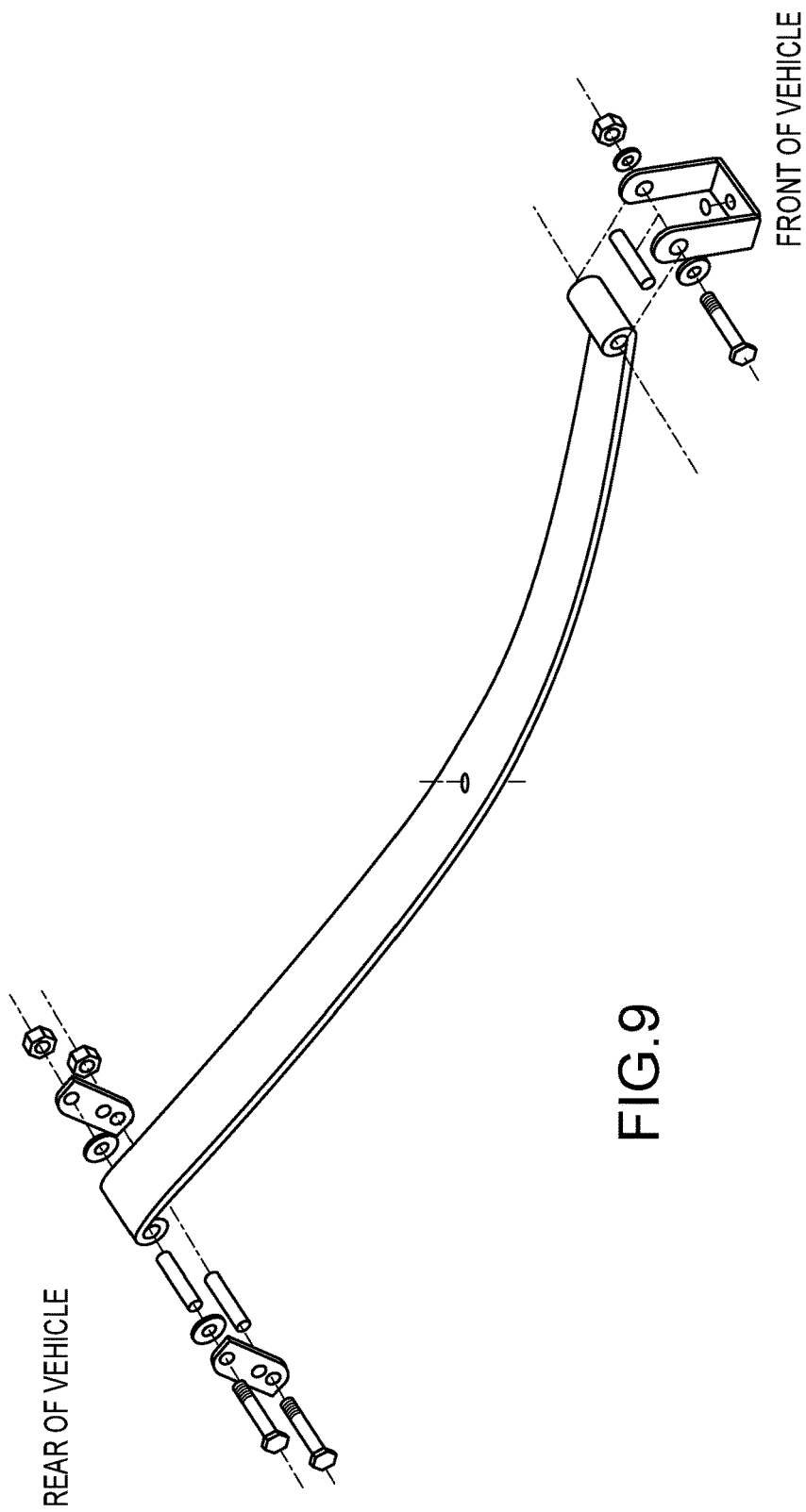

LEAF SPRING SYSTEM

CROSS-REFERENCES

This application is a US National phase of pending application PCT/AU2012/000025, filed Jan. 13, 2012, entitled "LEAF SPRING SYSTEM", which claims priority from pending Patent Application No. 2011900106, filed Jan. 13, 2011, entitled "LEAF SPRING SYSTEM" which are hereby incorporated by reference, as if set forth in full in this document, for all purposes.

FIELD OF THE INVENTION

The present invention generally relates to a leaf spring system and in particular to improving spring characteristics of such a leaf spring assembly using the leaf spring system.

Whilst the invention may be applied to any type of vehicle having a suspension system, for convenience sake it shall be described herein used by a motor vehicle.

BACKGROUND TO THE INVENTION

A vehicle's suspension is a component of the vehicle most susceptible to damage and it is often overlooked. The issue of spring sag in motor vehicles is a common aspect, often arising as manufacturers opt to go for comfort rather attain carrying ability. The consumer being unaware, expects the vehicle to carry full payload upon demand. However, this often is not possible with present day vehicles on the market as they generally all follow the same industry standard and have not addressed the carrying problem. The prior art has failed to provide a soft and comfortable ride as well as the correct carrying ability thereby creating maximum sag under full load.

There are serious issues for owners who are aware of the vehicle's carrying capacity but cannot achieve it because the springs are unable to constantly carry the load stipulated by the manufacturers. Therefore spring damage can be caused by the owner believing the vehicle is capable of carrying the full pay load placed upon it.

Spring damage is a serious issue but not the primary problem. It is the carrying ability and overall wear and tear that causes serious safety issues with the vehicle and the driver. In particular, steering and braking is seriously compromised by a soft and sagging suspension.

During the carrying of such a load, the vehicle becomes unsafe and unroadworthy as spring sagging reduces the traction to front wheels and stability control of the vehicle and reduces braking performance.

When the vehicle is carrying a heavy load, the vehicle is so weighed down to possibly cause the load to rock and sway. The wheels of the vehicle most likely will also often hard bounce off the road surface upon hitting bumps. A good suspension with an undamaged leaf spring assembly will improve performance by stabilizing the rear suspension to retain control with the wheels on the ground.

The prior art generally fails in providing a method of reducing or eliminating sagging and ensuring that the vehicle is safe to handle when carrying a heavy load by stabilizing body roll and improving braking performance.

In addition, the prior art fails in providing a method of reducing or eliminating rear spring sagging caused by the attachment of the vehicle to a trailer.

A common though low effectiveness technique provided by the prior art is to have the springs reset with an extra leaf. This requires removing the spring leaf assembly from the vehicle and is an expensive, timely and labour intensive process. In addition, the result of this technique causes an uncomfortable ride when no load is carried by the vehicle and inevitably, sagging will occur generally within 12 to 24 months if continuous maximum load is carried.

Currently the prior art has provided a leaf spring system as disclosed in AU 200158004. This is not commonly or generally known disclosure, however, such prior art documents have resulted in a number of significant disadvantages described herein. The tensioning of u-bolts at the rear of the leaf spring system in this patent application are unable to sustain continuous weight and movement in the forward and backward motion as the major spring pack flexes and the length of the spring is increased and decreased. Therefore the u-bolts are prone to snapping and breaking.

The nature of the invention in AU 200158004 comprises of a bulky and wide plate that protrudes above the spring and often interferes with LPG and petrol tanks, and also exhausts by rubbing or knocking continuously during a ride. This patent application provides for u-bolts to assist in the attachment to a leaf spring assembly. However, in the patent application, the inverted u-bolt further limits the distance between the load helper and the chassis rail and can therefore damage the chassis if the vehicle, for example, goes over a bump. In addition, the u-bolt can be over tightened and cause spring breakage.

One of the major problems in the prior art is the spring slippage or dislodgement of the spring which occurs as the leaf spring assembly is trying to move with the u-bolt as it is not designed to move independently in the backwards and forwards direction.

Therefore, the prior art lacks the ability to provide a suspension system with leaf spring assemblies to improve ride quality, load carrying capacity, towing and handling improvements, all of which add up to safer, more comfortable and enjoyable driving experience and achieve minimum sag to the rear of the vehicle.

Accordingly, it is an object of the present invention to at least partly overcome or ameliorate at least one of the disadvantages of the prior art or at least provide a viable alternative.

SUMMARY OF THE INVENTION

In accordance with the invention there is provided a leaf spring system using reinforcing spring for attachment to the leaf spring assembly in a vehicle for improving the spring characteristics of the leaf spring. The invention also provides a method of installation for attachment to a leaf spring assembly.

The invention also generally extends to a leaf spring system which includes a reinforcing spring which is secured relative to a leaf spring assembly; the reinforcing spring has at least one section, which provides resilience to the leaf spring system, and at least one attachment mechanism with which the at least one section in use is connectable to the leaf spring assembly, the at least one section provides support to the leaf spring assembly through the at least one attachment mechanism; wherein the at least one attachment mechanism has a sliding means which allows at least one leaf of the leaf spring assembly to stretch relative to the connecting member while supporting the leaf spring assembly thereby to allow operation and to improve spring characteristics of the leaf spring assembly.

The reinforcing spring may be secured to a top side of the leaf spring assembly.

The support may be pivotal.

The support may be adjustable using an attachment mechanism which allows adjustment of the positioning of one end of the reinforcing spring relative to the spring assembly thereby to adjust the level of tensioning in the reinforcing spring.

The attachment mechanism may allow the leaf spring assembly to stretch during use.

The leaf spring system may include first and second attachment mechanisms each of which is used to connect an end of the reinforcing spring to one end of the reinforcing spring; wherein the first attachment mechanism allows the respective end of the reinforcing spring to stretch and the second attachment mechanism allows the other end to deform.

The leaf spring system may provide a third stage of support which works with the first and second stages of the leaf spring assembly.

The reinforcing spring may include a connecting member of which at least one end thins towards the at least one end; wherein the thinning of the connecting member towards the respective end allows the respective end to have less material thereby to reduce a rebound force of the reinforcing spring generated through bending the respective end.

The connecting member may include two opposed ends each of which is thinned or tapers out towards the respective end, wherein the thinning of each end reduces the rebound of each end after the connecting member is placed under a load.

The connecting member may include a base portion and a curved portion which extends from the base portion; wherein the base and curved portions combined to form a preformed, curved shape body portion of the connecting member; wherein the base portion rest on the leaf spring assembly so that the curved portion extends away from the leaf spring assembly; wherein the connecting member carries the leaf spring assembly from above by using the base portion as a platform to provide support to the curved portion which resiliently provide support to the respective end of the leaf spring assembly.

A length of the base portion may be adjusted thereby adjusting an end of the curved portion; and wherein adjustment of the length of the curved portion adjusts the stiffness of the preformed, curved shape body portion.

The connecting member may include two curved portions; wherein each curved portion may have a different angle with which the respective curved portion extends from the base portion; and wherein the different angles allow for different movements at each end during support of the leaf spring assembly.

The connecting member may have a first end and an opposed, second end; the connecting member may include a shackle, with which the first end is connectable to the leaf spring assembly, and a hanger with which the second end is connectable to the leaf spring assembly; wherein the shackle is capable of supporting stretching of an end of the leaf spring assembly and the hanger is capable of supporting an opposed in of the spring assembly when distorted under load.

The hanger may have a length which is greater than 20 mm to cover a predetermined section of an end of the leaf spring assembly thereby to provide support to a greater support base for the leaf spring assembly.

In one form, the invention provides a reinforcing spring for a leaf spring system comprising of:
  a connecting member, for mounting the reinforcing spring about a leaf spring assembly, having a first end and a second end wherein the first end has a predefined distance of height to the leaf spring assembly; and
  an attachment mechanism providing at least partial manoeuvrability at the first end whereby the attachment mechanism has a predefined adjustability state.

The manoeuvrability at the first end can be rotational.

The manoeuvrability at the first end can also be pivotal.

According to one aspect, the present invention provides a reinforcing spring for a leaf spring system, the reinforcing spring comprises:
  a preformed curve shaped body portion having a connecting member, a first end and a second end;
  a first attachment mechanism connectable around the leaf spring system to provide pivotal connection of the first end of the preformed curve shaped body portion to the first attachment mechanism at a spaced position from a top of the leaf spring assembly and for allowing relative movement of the preformed curve shaped body portion in a forward and backward motion along a longitudinal direction of the leaf spring assembly;
  a second attachment mechanism is fixedly attachable to the leaf spring system and holding the second end of the preformed curve shaped body portion in a fixed state;
  wherein the reinforcing spring forms a single unit with the leaf spring assembly and improves spring load characteristics of the leaf spring assembly.

The pivotal connection of the first end of the preformed curve shaped body portion to the first attachment mechanism can be in the form of an enclosing circle of the preformed curve around a first connector. The enclosing circle allows for the threading of a first connector to fasten the first attachment mechanism to the first end of the preformed curve shaped body portion.

In another embodiment, the first attachment mechanism can be in the form of a cupping feature.

The first attachment means can include a first connector and spaced second connector for mounting around the leaf spring system and providing the pivotal connection of the first end of the preformed curve shaped body portion to the first attachment mechanism at a spaced position from the top of the leaf spring system.

The curve of the preformed curve shaped body portion and the spacing of the first connector and spaced second connector provide the torsional resilience of the reinforcing spring for the leaf spring system when in position.

The first connector and second connector mechanisms comprises of male and female components. In one form the first connector and second connector is a brass bush which is designed to be lubricated by a greasable pin which becomes part of the shackle. The brass bush can be threaded. In another form the first connector and second connector is a screw and nut. In a further embodiment, the first connector and second connector is a bolt that goes through a plastic bush and nut. The plastic bush is designed to minimise wear to the main leaf pack as to reduce friction and noise.

In one embodiment, the first attachment mechanism is in the form of a shackle. The shackle comprises of at least two plates fastened to either side of the first end by the first connector and around the leaf spring assembly by a second connector.

The plates provide for a predetermined adjustable state whereby the predetermined state moves to a medium state as a result of securing the second connector to the medium control. The predetermined state moves to a hard state as a result of securing the second connector to the hard control. The hard predetermined state provides for greater curve angle by the preformed shaped body.

The medium control and the hard control can be predefined by apertures in the plurality of plates.

The reinforcing spring has a second attachment mechanism in the form of a metal fixing such as a U-bolt. The U-bolt comprises of a cross plate, a nut and u-shaped bolt. The U-bolt is preferably flat and connects the second end to the leaf spring assembly in a preferably fixed and secured position.

The leaf spring system further comprises of a method of installation comprises of:
- mounting the reinforcing spring to the top of a leaf spring assembly in a longitudinal direction according to the direction of the leaf spring assembly;
- attaching the second end of the reinforcing spring to the leaf spring assembly by the second attachment mechanism;
- aligning at least two opposing plates at either side of the first end of the reinforcing spring;
- attaching the first end of the reinforcing spring to the at least two plates by a first attachment mechanism; and
- setting and maintaining the plates to the chosen predetermined adjustable state.

The leaf spring system further comprises a method of using a reinforcing spring including the steps of:
- mounting the reinforcing spring to the top of a leaf spring assembly along the longitudinal direction of the leaf spring assembly; and
- movement of the reinforcing spring in a backward and forward direction with the leaf spring assembly.

In a further embodiment, the invention provides a leaf spring system for use with a leaf spring assembly, the leaf spring system includes a reinforcing spring which is secured relative to the leaf spring assembly; the leaf spring assembly includes a connecting member which has at least one section providing resilience to the leaf spring system; wherein the at least one section provides support to the leaf spring assembly thereby to improve spring characteristics of the leaf spring assembly.

The invention could also extend to a leaf spring system which includes a reinforcing spring which is secured relative to a leaf spring assembly; the reinforcing spring has at least one curved section, which provides resilience to the leaf spring system, and at least one attachment mechanism with which the at least one curved section in use is connectable to the leaf spring assembly, the at least one curved section provides support to the leaf spring assembly through the at least one attachment mechanism; wherein the at least one attachment mechanism is mounted to the at least one curved section to allow at least partial pivotal rotation of the at least one attachment mechanism relative to the reinforcing spring thereby allowing at least one leaf of the leaf spring assembly to stretch relative to the connecting member while supporting the leaf spring assembly to allow operation and to improve spring characteristics of the leaf spring assembly.

The at least one curved section may form a first end of the reinforcing spring; the at least one curved section thins out towards the first end of the reinforcing spring; and wherein the thinning of the reinforcing spring towards the first end allows the end to have less material thereby to reduce a rebound force of the reinforcing spring generated through bending of the curved section.

The at least one attachment mechanism may extend downwardly from the at least one curved section so that an upper end of the at least one attachment mechanism substantially align with an upper surface of the at least one curved section.

The invention could also extend to a leaf spring system which includes a reinforcing spring which is securable relative to a leaf spring assembly, the leaf spring assembly comprising of a plurality of leaf springs for use in supporting a vehicle; the reinforcing spring has at least one curved section, which provides resilience to the leaf spring system, and at least one attachment mechanism with which the at least one curved section in use is connectable to the leaf spring assembly, the at least one curved section provides support to the leaf spring assembly through the at least one attachment mechanism; wherein the at least one attachment mechanism is mounted to the at least one curved section to allow at least partial pivotal rotation of the at least one attachment mechanism relative to the at least one curved section thereby allowing at least one leaf of the leaf spring assembly to stretch relative to the connecting member while supporting the leaf spring assembly to allow operation and to improve spring characteristics of the leaf spring assembly.

BRIEF DESCRIPTION OF THE DRAWINGS

In order that the invention can be more readily understood one or more embodiments of the invention are further described by way of example with reference to the accompanying drawings.

FIGS. 2A and 2B provide a diagrammatic view of the reinforcing spring with the shackle in accordance with U bolt unattached and attached in accordance with the first embodiment of the invention of FIG. 1;

FIGS. 6A, 6B and 6C provide a diagrammatic view of the reinforcing spring, the reinforcing spring with shackle and support hanger, and the full arrangement in use of a second embodiment of the invention having a full three stage dynamic leafspring;

FIGS. 7A, 7B and 7C provide a diagrammatic view of a second embodiment of the invention having half three stage dynamic leaf spring;

FIG. 9 is a diagrammatic view of the showing use of the leaf spring assembly from front to rear of a vehicle of a spring support bracket assembly used in the third embodiment of the reinforcing spring.

DESCRIPTION OF ILLUSTRATED EMBODIMENTS OF THE INVENTION

Figure 1:
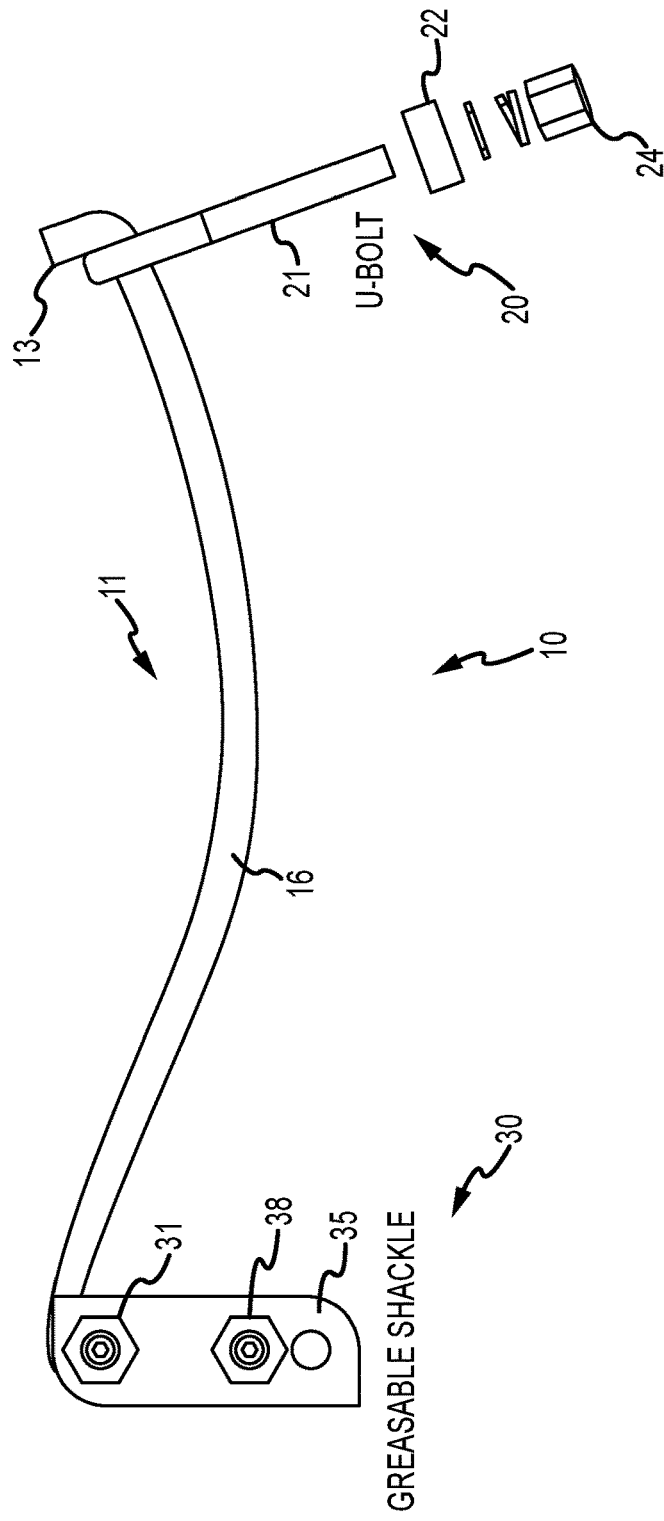
FIG. 1 provides a diagrammatic view of the reinforcing spring with the shackle and U-bolt in accordance with a first embodiment of the invention when not attached to leaf spring assembly.

Referring to the accompanying representations, FIG. 1 shows that the invention provides a reinforcing spring 10 mounted above a leaf spring assembly 1 in a vehicle. The leaf spring assembly 1 comprises of several flat steel leaf spring strips bundled together to form a shock absorbing, load carrying suspension component. The leaf spring assembly 1 is used to support an axle of the vehicle.

The reinforcing spring 10 is mounted to a back or shackle end of the leaf spring assembly 1. Thus, in the first embodiment the reinforcing spring 10 operates relative to a back half of the leaf spring assembly.

However, it is envisaged that the invention can be modified in order to allow the reinforcing spring 10 to attach to the leaf spring assembly 1.

Referring to FIGS. 1 to 3C, it is shown that the reinforcing spring 10 comprises of a preformed curve shaped body portion 11 mounted to the leaf spring assembly 1 between a first attachment mechanism 30 and a second attachment mechanism 20.

The preformed curve shaped body portion 11 has a first end 14, a second end 13 and a connecting member 16. Thus, the first end 14 points towards the shackle end of the leaf spring assembly with the second end pointing towards a front or fixed pin end. The reinforcing spring 10 has a preformed prestressed body portion forming primarily the connecting member 16. The reinforcing spring is preferably made from high tensile spring steel and, when mounted, is positioned on top of the leaf spring assembly 1 in the same longitudinal direction as the leaf spring assembly 1. The reinforcing spring 10 can be graphite coated to reduce friction with the leaf spring assembly. The first attachment mechanism 30 is connectable around the leaf spring system 1 to provide pivotal connection of the first end 14 of the preformed curve shaped body portion 11 to the first attachment mechanism at a spaced position from the top of the leaf spring system.

The connecting member 16 is preformed and prestressed to provide a shape with a bend such that, in use, the reinforcing spring can be tensioned against the leaf spring to alter the stiffness characteristics of the leaf spring under varying vehicle loads. As the connecting member 16 is prestressed, it provides a curved body portion to the reinforcing spring providing a substantially central point of inflection. The connecting member 16 is capable of flexing according to the point of inflection. Such a structure assists in eliminated sagging.

The second attachment mechanism 20 is fixedly attachable to the leaf spring system 1 and holding the second end 13 of the preformed curve shaped body portion 11 in a fixed state.

The first end 14 can connect to the attachment mechanism 30 to the leaf pack assembly 1. In the embodiment presented in FIG. 3, the first end is provided in the form of an enclosing circle 15 extending from one end of the connecting member 16. The enclosing circle is sufficient in circumference to allow for the threading or insertion of a first connector 31. The enclosing circle embodiment of the invention is able to provide an interference fit with a brass bush.

The enclosing circle 15 provides the pivotal motion and manoeuvrability in which to allow for the backward and forward motion as the enclosing circle 15 pivotally rotates around the attachment mechanism 30.

In a second embodiment, the first end 14 and/or second end 13 can be formed into a cupping feature. In such an embodiment, the cupping features provide a rotational motion around the attachment mechanism 30.

The second end 13 assists in connecting, locking or securing into position the second attachment mechanism 20 to connect the reinforcing spring 10 to the leaf pack assembly 1. In the embodiment presented in FIG. 1, the second end 13 is in the form of an outwardly protruding member that is adjacent in a right angle to the connecting member 16. In alternative embodiment, the second end can be provided with apertures in which to house the second attachment mechanism.

The first attachment mechanism 30 can, in one form, be a shackle. In this form, the first attachment mechanism 30 comprises of a plurality of plates 32 and the first connector 31 in the form of male and female components for fitment to a brass bush. The brass bush provides an interference fit. In doing so the attachment mechanism 30 is able to provide a clearance of over 25 mm in from other features of the vehicle such as the exhaust or petrol tank.

Figure 3C:
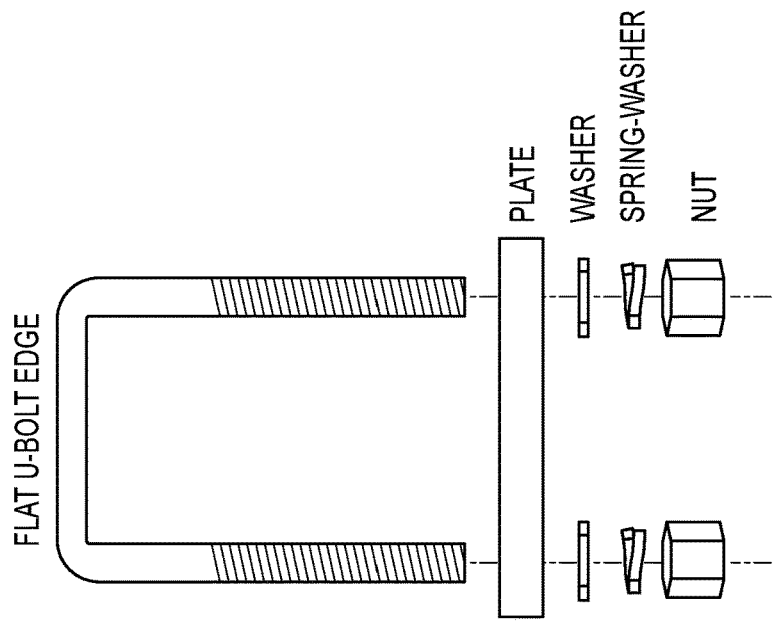
FIGS. 3A and 3B provide a diagrammatic view of the component of the shackle and FIG. 3C of the U-bolt, for use in the first embodiment of the invention of FIG. 1.
Figure 3B:
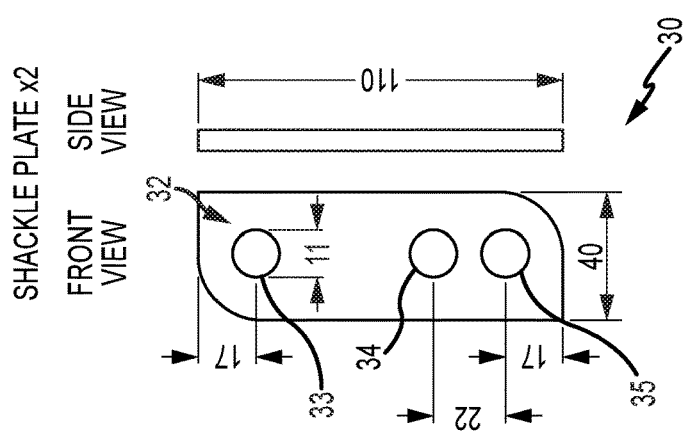
Figure 4A:
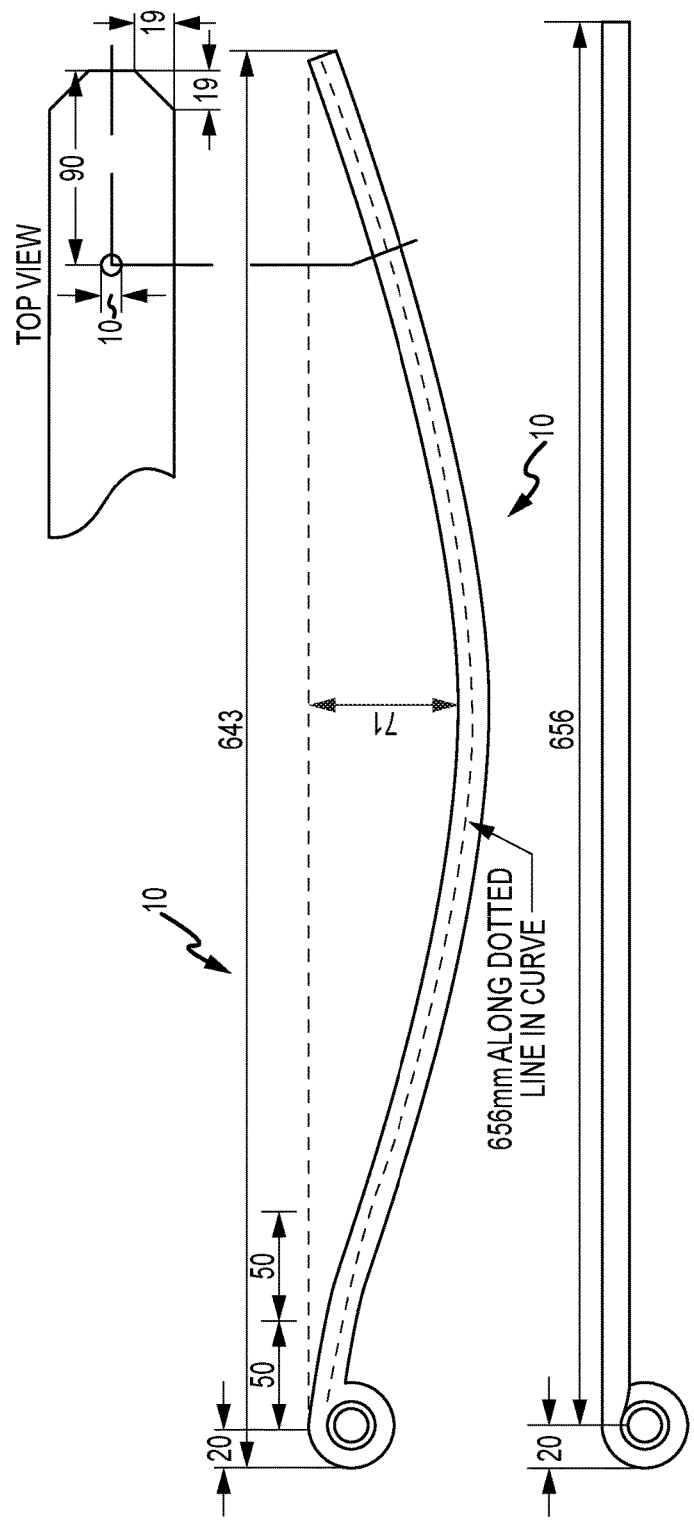
FIGS. 4A and 4B provide diagrammatic views of the reinforcing spring showing various suitable dimensions and curvatures thereof.
Figure 4B:
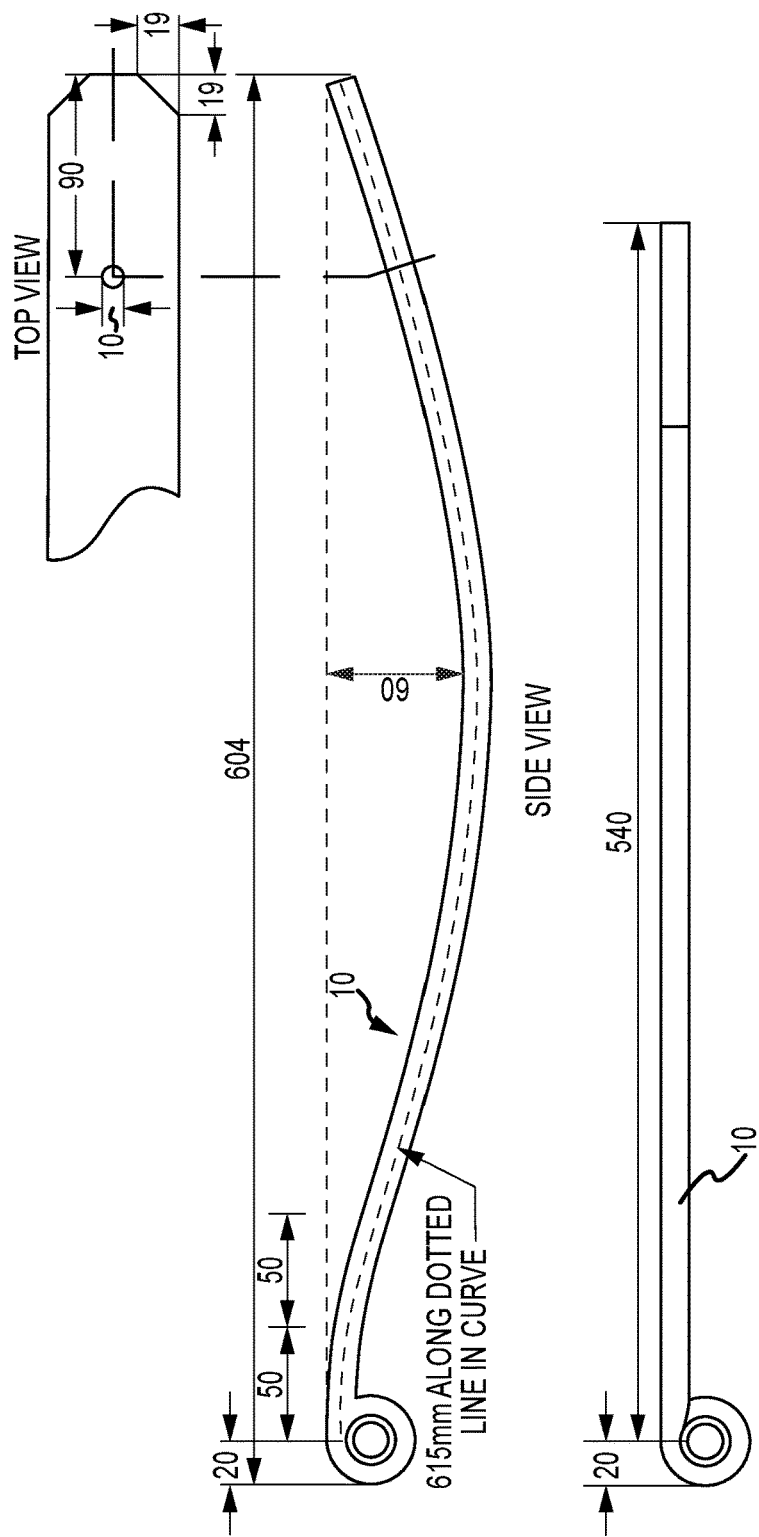

Referring to FIG. 3B, the plurality of plates 32 comprises of a flat member having a series of apertures. A first of the series of apertures 33 allows for the threading of the first connector through the brass bush, which is lining the enclosing circle 15 of the reinforcing spring 10 and fitted into position.

The plurality of plates further comprises a second of the series of apertures 34 and a third of the series of apertures 35. This forms the predetermined adjustable state. A user depending on their needs can adjust the reinforcing state to a hard state or a medium state as a result of the positioning of a second connector 38 which can also be mounted to a brass bush. The second of the apertures 34 defines the hard state by providing a hard controller and the third aperture 35 defines a medium state by providing a medium controller. The hard controller is defined as such as a result of the angle formed at the point of inflection of the connecting member 16.

The predetermined adjustable state provides a predefined tension level. The user is therefore unable to cause damage to the reinforcing spring or the components thereof. This prevents the ability of a user to over tighten the attachment mechanisms leading to the damage of the leaf spring assembly. Further, the invention overcomes the disadvantages of the prior art by equalising or distributing the tension of the reinforcing spring. As such the components of the reinforcing spring susceptible or vulnerable, such as the attachment mechanisms, are reduced.

In the embodiment presented in FIGS. 3A and 3B, the shackle is provided as two identical plates. However, it is envisaged that the shackle can comprise of a single inverted u-shape plate.

The first attachment mechanism 30 provides a pivotal connection to the first end of the reinforcing spring 10 and a further connection to the leaf spring assembly 1. As such the reinforcing spring is then provided with pivotal movement and can move in a forward and backward motion along the longitudinal direction of the leaf spring assembly. Such a feature of the reinforcing spring provides endurance to reinforcing spring in addition to ensuring that the reinforcing spring maintains its position and does not become dislodged during use and further the advantage over the prior art by preventing the damage to the second attachment mechanism 20.

The advantage of the pivotal connection is to provide movement of the reinforcing spring according to the movement of the leaf spring assembly.

The second attachment mechanism, as illustrated in FIGS. 1 and 3C, can be in the form of a metal fixing such as a U-bolt 20. The U-bolt 20 comprises of a cross plate 22, a nut 24 and u-shaped member 21. The U-bolt is secured by the second end 13 of the reinforcing spring to prevent movement and frictional damage to the connecting member 16. In addition, by such securement, the damage or breakage to the u-bolt is substantially reduced. The u-bolt is therefore positioned preferably along the second end 13 of the reinforcing spring 10.

The u-shaped member 21 of the U-bolt is inverted and positioned such that the two arms of the u-shaped member extend along the leaf spring assembly 1 to be attached by use of the cross plate 22 and nuts 24 underneath the leaf spring assembly 1.

The first and second attachment mechanism therefore operate together to improve the distribution of pressure on the load bearing surfaces.

The reinforcing spring 10 can be a separate unit, or forming part of the whole leaf spring assembly 1 as is shown in FIG. 2A. Thus, the reinforcing spring can be fitted to existing, original manufacturing equipment or can be part of a replacement leaf spring assembly which can be used to replace the original manufacturing equipment.

In a second embodiment 10A of the invention. Like reference numerals are used to designate like components between the reinforcing springs 10 and 10A, the first and second attachment mechanisms further assist in fitting the reinforcing spring 10 as part of the leaf spring assembly such that the reinforcing spring forms a single unit the leaf spring assembly. Therefore, unlike the prior art, the reinforcing spring 10 is not an add on, but forms part of the leaf spring assembly. This is further enhanced through the ability of the reinforcing spring to form part of the leaf back with drilled holes (not shown). In such an embodiment, the reinforcing spring has predefined apertures which can be formed by simple drilling techniques. The apertures allow the connection to the leaf spring assembly.

In comparative views (not shown) where the original manufacturing equipment leaf spring assembly 40 is unsupported by the reinforcing spring, with no load, and under a load of 1000 kg, the unsupported leaf spring assembly 40 has a flatter curvature whereas fitment of the reinforcing spring 10 causes the leaf spring assembly to have a deeper curvature due to the upper pulling of the reinforcing spring on the shackle end. The reinforcing spring 10 assists in improving the load supporting curvature of the leaf spring assembly 1 even when placed under a load.

The curved nature of the leaf spring assembly assists in providing yieldable support. Thus, reducing the curved nature of the leaf spring assembly, for example when placed under a load thereby to adopt a flatter profile, reduces the effectiveness of the leaf spring assembly and the ability of the leaf spring assembly to provide shock absorption.

Figure 5:
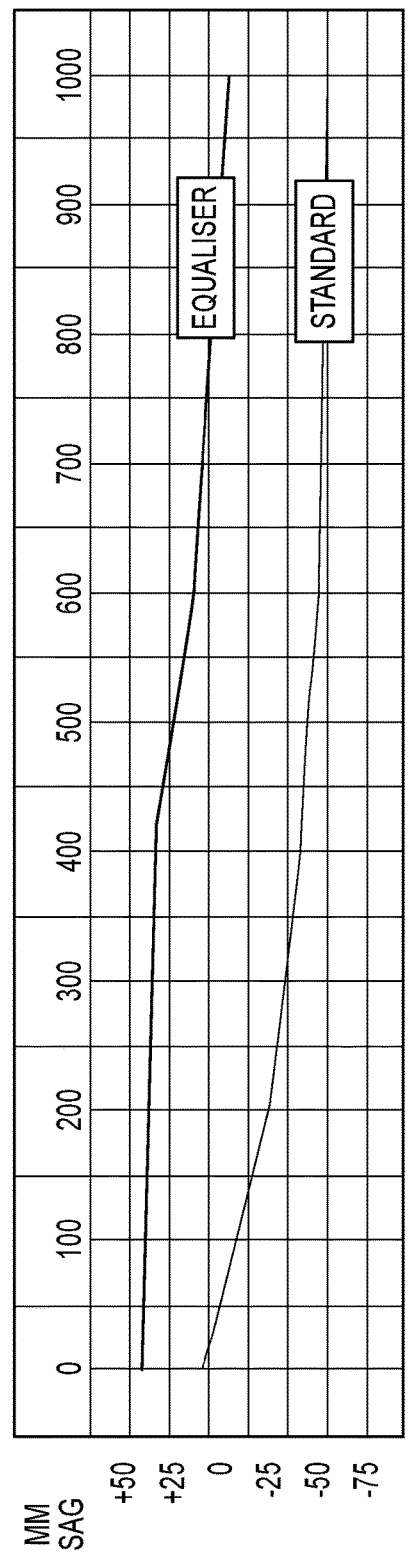
FIG. 5 is a comparative graph showing the amount of sag experienced in a vehicle being fitted with the enforcing spring of the present invention when compared to a leaf spring assembly installed in the vehicle as original manufacturing equipment.

A comparative graph of the amount of sag experience by the leaf spring assembly 40 with and without the reinforcing spring 10 is shown in FIG. 5. The position adopted by the original manufacturing equipment is shown by the line mark as "Standard" in the graph whereas the position adopted by the leaf spring assembly, having a reinforcing spring 10 fitted thereto, is shown by the line marked as "equaliser". It is clear that fitment of the reinforcing spring causes the leaf spring assembly to provide an additional 50 mm lift compared to the zero position provided by the original manufacturing equipment. Placing 100 kg of load on the vehicle results the original manufacturing equipment to experience a sag of around 25 mm. Comparatively, the reinforcing spring causes the leaf spring assembly to experience little sag with up to 400 kg placed on the vehicle. Furthermore, the reinforcing spring assist in maintaining the leaf spring assembly in a position with a 1000 kg load which substantially matches the zero position of the original manufacturing equipment. Thus, it is clear that fitment of the reinforcing spring assists in maintaining the shock absorbing curvature of the leaf spring assembly even when a 1000 kg load is placed thereon. With 1000 kg on the leaf spring assembly the position adopted by the leaf spring assembly is substantially similar to that adopted by the original manufacturing equipment when no load is placed thereon. Since the ability to absorption shocks by the leaf spring assembly is promoted by the curvature adopted by the assembly, causing the leaf spring assembly carrying 1000 kg of load to adopt the zero position will improve the shock absorbing ability of such a leaf spring assembly.

The equaliser or reinforcing spring 10 can be shipped in a box format. The pre-drilled reinforcing spring 10 is attached to the original leaf pack or leaf spring assembly 1 as part of a single unit that cannot be shifted once in place by the means of the centre bolt that holds the entire leaf pack together.

The reinforcing spring can be purchased as a kit for installation by a mechanic or owner of a vehicle. The kit can comprise of the different components required for the installation of the reinforcing spring. The use of such a kit can deliver a high quality ride, maximise safety and achieve minimum sag to rear. In one embodiment, the invention can reduce sag of 75 mm to 20 mm of sag.

FIGS. 6A to 7C shows a further embodiment 10B of the reinforcing spring of the invention. Like reference numerals are used to designate like components between reinforcing springs 10 and 10B. FIGS. 6A, 6B and 6C show the reinforcing spring, the reinforcing spring with shackle and support hanger, and the full arrangement in use as a full three stage dynamic leafspring. FIGS. 7A and 7B show a half three stage dynamic leaf spring.

In this embodiment, the second attachment mechanism is in the form of a spring support bracket assembly or hanger 20B which supports a front end or fixed pin end of, the leaf spring assembly 1. The first attachment mechanism or shackle 30 is used to support the shackle end of the leaf spring assembly. In other words, the leaf spring system includes first and second attachment mechanisms each of which is used to connect an end of the reinforcing spring to one end of the reinforcing spring with the first attachment mechanism allowing the back end of the reinforcing spring to stretch and the second attachment mechanism allows the other end to deform.

The shackle 30 includes a sliding means in the form of the second connector pin 38 which allows at least one leaf of the leaf spring assembly to stretch relative to the reinforcing spring while supporting the leaf spring assembly to allow operation and to improve spring characteristics of the leaf spring assembly. The second connector pin which is spaced from the first end and is shaped to facilitate sliding movement of the leaf spring assembly relative to the reinforcing spring thereby to accommodate curved extensioning of the leaf spring assembly when placed under a load.

The reinforcing spring 10B therefore has two curved portions 60 with which the reinforcing spring is capable of providing support to the leaf spring assembly 1. During normal operation of the leaf spring assembly it can be generally understood that the rear or shackle end thereof experiences stretching whereas the front end thereof experiences distortion or bending when the leaf spring assembly is placed under load.

Each of the curved sections thins out towards a respective end of the reinforcing spring 10B. The thinning of the reinforcing spring towards the respective end allows the end to have less material thereby to reduce a rebound force of the reinforcing spring generated through bending of the curved section. In other words, each end is thinned or tapers outwardly so that the thinning of each end reduces the rebound of each end after the connecting member is placed under a load.

The connecting member therefore has a base portion 62 and two curved portions 60 which extend from the base portion. The base rests on the leaf spring assembly 1 so that the curved portions extends away from the leaf spring assembly. The reinforcing spring 10B carries the leaf spring assembly 1 from above by using the base portion as a platform to provide support to the curved portions which resiliently provide support to the respective end of the leaf spring assembly.

The design at the front of the spring is for picking up additional weight disbursement as the spring is forced to straighten. The hanger will carry more weight as more pressure is applied to it. The hanger is able to pivot and move slightly as the spring flexes. The design at the back provided by the swing shackle is for dynamic support such that allows flex and movement within limitations.

As shown in FIGS. 7A, 7B and 7C there is often needed customisation of spring system to a vehicle due to differences of flex of spring pack and chassis configuration etc. However there is an approach required including the steps of:
a) providing a reinforcing spring 10 having a bend such that when one end is attached to central pin of leaf spring assembly 1 the distal end extends away from the top of leaf spring assembly 1;
b) attaching predrilled reinforcing spring 10 to the leaf spring pack to form part of a single unit that cannot be shifted once in place by the means of the centre bolt that holds the entire leaf pack together;
c) stressing the unattached end of the reinforcing spring 10 relative to the leaf spring assembly by attachment of a dynamic attachment that allows controlled flex to provide support while minimising localised stress.

The step of providing a reinforcing spring can include:
(i) providing a bend that provides a critical height distance H of the unattached end above the leaf spring assembly 1 at a distance L from the leaf spring assembly 1 attachment that is required to vary clearance, ride height and performance required. It has been found that 75 mm is an exceptionally favourable height of H. L is usually at mid position of end of the middle leaf of the leaf spring assembly 1;

This can result in various lengths and dimensions of the reinforcing spring to allow for ΔH and ΔL of FIG. 11A such as provided by reinforcing springs 10 as those shown in FIGS. 5A and 5B. In FIG. 5A length along spring 10 is 656 mm while in FIG. 5B length is 615 mm. Further as shown in these drawings the bend preferably has a peak halfway along and substantially symmetrical on either side which in FIG. 5A the inverted peak is 71 mm from imaginary 643 mm base while in FIG. 5B the inverted peak is 60 mm from imaginary 604 mm base. Therefore when fitted such as in 11B it provides the bend with required flex and required H and L for use.

The step of stressing the unattached end of the reinforcing spring 10 relative to the leaf spring assembly is by attachment of a dynamic attachment that allows controlled flex to provide support while minimising localised stress. This dynamic attachment is preferably the swing shackle 30 fitting around the leaf spring assembly 1 and attached by grease pin 28. The swing shackle fits at a 90° angle to the extension of the leaf spring assembly 1. The wrap around clamp usually around the multiple leaves of the leaf spring assembly 1 can be retained at the far end but is usually removed at the end for attaching the reinforcing spring.

Figure 8A:
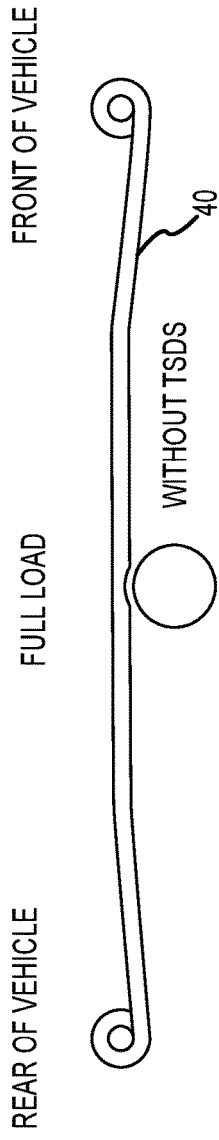
FIGS. 8A and 8B form a series of schematic illustrations which show the effect of the reinforcing spring of an embodiment of use of the leaf spring assembly from front to rear of vehicle.
Figure 8B:
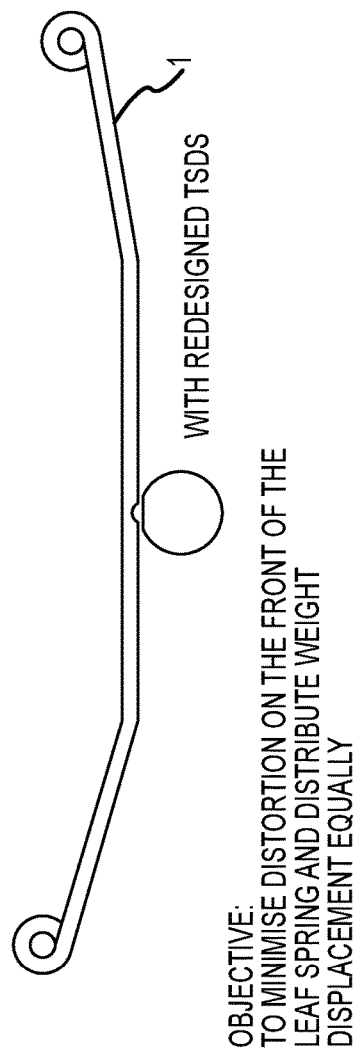

FIGS. 8A and 8B show the effect which the reinforcing spring 10B could have at each end of the leaf spring assembly 1. The original manufacturing equipment 40 could experience so much the formation that the leaf spring assembly adopts an inverted U-shape under a full load. Comparatively, the leaf spring assembly 1 could substantially adopt the zero position under full load which is the position the original manufacturing equipment 40 could have adapted under zero load.

Referring to FIG. 9 the arrangement can extend between the front and rear of the vehicle. The spring arrangement of FIG. 9, has the hanger 20B including at least one nylon plate which assists in reducing friction between the leaf spring assembly 1 and the hanger. A greasable bolt is used to secure the respective end of the reinforcing spring 10B. As best can be seen in this Figure, each end of the reinforcing spring includes a role eye which allows the respective attachment mechanism, in this instance the hanger, to be mounted to the reinforcing spring to allow at least partial pivotal rotation relative to the reinforcing spring.

Each of the attachment mechanisms or hanger 20 and shackle 30 extends downwardly from the respective curved section so that an upper end of the respective annual shackle substantially aligns with an upper surface of the at least one curved section.

It can be seen that the invention provides a leaf spring system for use with rear leaf suspension assemblies that could suit most likely to vehicles including light commercial vehicles. The leaf spring system could improve the ability of the leaf springs assembly to carry up to 450 kg extra. The leaf spring system could also be combined with a leaf spring system to form an assembled unit which can be used to replace original manufacturing equipment.

The reinforcing spring forming part of the leaf spring system pulls outwardly at least one or both ends of the leaf spring assembly. This upward movement improves the curvature of the leaf spring assembly which could improve the performance of the leaf spring assembly during driving conditions and could revive the following benefits:
reducing or substantially eliminating body roll as the reinforcing spring forces ends of the leaf spring assembly upwardly which reduces the likelihood of the body starting to roll, for example when the vehicle is driven around a corner, as the reinforcing spring assist the leaf spring assembly to carry the extra load placed on the assembly due to sideways movement of the body;
improving the load carrying capability of the vehicle including substantially carrying full payload;
increasing safety by promoting wheel contact with the road surface due to the vehicle axle being pushed downwardly as a result of the ends of the leaf spring assembly being pulled upwardly;
increasing comfort during driving due to the increased curvature of the these spring assembly even when the vehicle is carrying a load; and
increase in control as the vehicle wheels of forced into contact with the road surface during driving due to operation of the reinforcing spring, and the reduction in body roll which assist in maintaining proper contact between the wheels and the road surface.

The leaf spring assembly could also include novel spacers which could increase comfort when driving reducing noise which may be caused to operation of the leaf spring assembly. The reinforcing spring could provide a preloaded system which assists in improving the load carrying curvature of a leaf spring assembly. The leaf spring assembly could also provide extra height to the vehicle due to the upward pulling of at least one end of the leaf spring assembly. The extra height could be on average around 65 mm when compared to regional manufacture equipment to stage leaf spring systems.

The leaf spring system could also provide an extra stage to typical original manufacturing equipment which normally consists of two stages. Generally the first stage is provided by the primary pack and the second stage by the load carrying spring. Adding in the reinforcing spring provides a third stage which could act as a pre-loader of the leaf spring assembly by pulling at least one end of the leaf spring assembly upwardly.

While we have described herein a particular embodiment of a leaf spring system, it is further envisaged that other embodiments of the invention could exhibit any number and combination of any one of the features previously described. However, it is to be understood that any variations and modifications which can be made without departing from the spirit and scope thereof are included within the scope of this invention.

Any reference to publications in this specification is not an admission that the disclosures constitute common general knowledge in Australia.

The claims defining the invention are as follows:

1. A reinforcing spring for a leaf spring system having a plurality of leaf springs each having ends that curve in an upward direction from a lower portion to an upper portion of the leaf spring system, the reinforcing spring comprising:
   a preformed curved body portion, having a greater curvature than that of the leaf spring system
   a first end and a second end wherein the first end and second end are unsymmetrical,
   an enclosing or cupping feature for pivotal connection of the first end,
   a first attachment mechanism connectable around the leaf spring system to provide pivotal connection of the first end of the preformed curved body portion to the first attachment mechanism at a spaced position from an inside radius of the leaf spring system and for allowing relative movement of the preformed curved body portion in a forward and backward motion along the inside radius of the leaf spring system and in a longitudinal direction of the leaf spring system, wherein the first attachment mechanism comprises a shackle with at least two of a plurality of plates, a first connector for fastening the plates to each side of the first end and for pivotal connection with the first end via the enclosing or cupping feature, and a spaced second connector for mounting beneath at least one leaf of the leaf spring system for facilitating sliding and support of the at least one leaf of the leaf spring system, wherein the first connector includes a pin, bolt or screw, and the second connector includes a pin, bolt or screw, and a bush or tube for receiving the pin, bolt or screw,
   a second attachment mechanism fixedly attachable to the leaf spring system and holding the second end of the preformed curved body portion in a fixed state,
   wherein the reinforcing spring forms a single dynamic unit with the leaf spring system and improves spring load characteristics, and
   wherein the reinforcing spring is secured on the inside radius of the leaf spring system when the leaf spring system is in a resting state.

2. A reinforcing spring for a leaf spring system according to claim 1 wherein the reinforcing spring thins out towards the first end, wherein the thinning of the reinforcing spring towards the first end allows the first end to have less material thereby to reduce a rebound force of the reinforcing spring generated through bending of the preformed curved body portion while still maintaining a supporting strength.

3. A reinforcing spring for a leaf spring system according to claim 1 wherein the plurality of plates provide for a predetermined adjustable state whereby the predetermined adjustable state moves to a medium state as a result of securing the second connector to a medium setting and the predetermined adjustable state moves to a hard state as a result of securing the second connector to a hard setting wherein the hard state provides for greater curve angle by the preformed curved body portion.

4. A reinforcing spring for a leaf spring system according to claim 3 wherein the medium setting and the hard setting are predefined by apertures in the plurality of plates.

5. A reinforcing spring for a leaf spring system according to claim 1 wherein the second attachment mechanism in a form of a metal U-bolt fixing comprises a cross plate, a nut and u-shaped bolt and connects the second end to the leaf spring system in a fixed and secured position.

6. A reinforcing spring for a leaf spring system according to claim 1 wherein the first connector further includes a brass bush, the bush or tube of the second connector is a brass bush, the respective pin, bolt or screw of each of the first connector and second connector is a greasable pin, each brass bush being designed to be lubricated by the respective greasable pin, wherein each brass bush is threaded.

7. A reinforcing spring for a leaf spring system according to claim 1 wherein the pivotal connection of the first end of the preformed curved body portion to the first attachment mechanism is in a form of an enclosing circle of the preformed curved body portion around the first connector.

8. A reinforcing spring for a leaf spring system according to claim 7 wherein the enclosing circle allows for the threading of the first connector to fasten the first attachment mechanism to the first end of the preformed curved body portion.

9. A reinforcing spring for a leaf spring system according to claim 1 wherein the first connector and second connector each include a nut.

10. A reinforcing spring for a leaf spring system according to claim 1 wherein the pin, bolt or screw of the first connector is a bolt that goes through a plastic bush and a nut, the pin, bolt or screw of the second connector is a bolt, the bush or tube of the second connector is a plastic bush, the bolt of the second connector goes through the plastic bush of the second connector and another nut, wherein the plastic bush is designed to minimize wear.

11. A leaf spring system, comprising:
   a first stage in a form of a leaf spring assembly comprising of a plurality of leaf springs each having ends that curve in an upward direction from a lower portion to an upper portion of the leaf spring assembly;
   a second stage in a form of a load carrying spring included in the leaf spring assembly;
   a third stage provided by a reinforcing spring having a greater curvature than that of the leaf spring assembly, that is positioned relative to the first stage by pulling at least one end of the leaf spring assembly upwardly, such that each of a first end and a second end of the reinforcing spring curves away from the leaf spring assembly, wherein the reinforcing spring is secured on an inside radius of the leaf spring assembly when the leaf spring system is in a resting state, the reinforcing spring having:

a preformed curved body portion, in a shape different to that of the leaf spring assembly, the preformed curved body portion having a connecting member wherein the preformed curved body portion is preloaded such that it is dynamic, wherein the first end and second end are unsymmetrical;

an enclosing or cupping feature for pivotal connection of the first end;

a first attachment mechanism connectable around the leaf spring system to provide pivotal connection of the first end of the preformed curved body portion to the first attachment mechanism at a spaced position from the inside radius of the leaf spring system and for allowing relative movement of the preformed curved body portion in a forward and backward motion along the inside radius of the leaf spring system and in a longitudinal direction of the leaf spring assembly, wherein the first attachment mechanism comprises a shackle with at least two of a plurality of plates, a first connector for fastening the plates to each side of the first end and for pivotal connection with the first end via the enclosing or cupping feature, and a spaced second connector for mounting beneath at least one leaf of the leaf spring system for facilitating sliding and support of the at least one leaf of the leaf spring system, wherein the first connector includes a pin, bolt or screw and the second connector includes a pin, bolt or screw, and a bush or tube for receiving the pin, bolt or screw; and a second attachment mechanism fixedly attachable to the leaf spring system and holding the second end of the preformed curved body portion in a fixed state, wherein the reinforcing spring forms a single dynamic unit with the leaf spring assembly and improves spring load characteristics.

12. A method of assembling a reinforcing spring to a leaf spring assembly, comprising the steps of:

providing a first stage leaf spring assembly, comprising of a plurality of leaf springs each having ends that curve in an upward direction from a lower portion to an upper portion of the leaf spring assembly;

including in the leaf spring assembly a second stage load carrying spring;

connecting a third stage reinforcing spring to the leaf spring assembly by:

providing the third stage reinforcing spring in a form of a preformed preloaded curved body portion, having a greater curvature than that of the leaf spring assembly, wherein each of a first end and a second end of the reinforcing spring curves away from the leaf spring assembly, wherein the first end and second end are unsymmetrical, wherein the reinforcing spring is secured on an inside radius of the leaf spring assembly when the leaf spring assembly is in a resting state;

providing an enclosing or cupping feature for pivotal connection of the first end, providing a first attachment mechanism connectable around the leaf spring assembly to provide pivotal connection of the first end of the preformed preloaded curved body portion to the first attachment mechanism at a spaced position from the inside radius of the leaf spring assembly and for allowing relative movement of the preformed preloaded curved body portion in a forward and backward motion along the inside radius of the leaf spring assembly and in a longitudinal direction of the leaf spring assembly, wherein the first attachment mechanism comprises a shackle with at least two of a plurality of plates, a first connector for fastening the plates to each side of the first end and for pivotal connection with the first end via the enclosing or cupping feature, and a spaced second connector for mounting beneath at least one leaf of the leaf spring system for facilitating sliding and support of the at least one leaf of the leaf spring system, wherein the first connector includes a pin, bolt or screw, and the second connector includes a pin, bolt or screw, and a bush or tube for receiving the pin, bolt or screw; and providing a second attachment mechanism fixedly attachable to the leaf spring assembly and holding the second end of the preformed preloaded curved body portion in a fixed state, wherein the third stage reinforcing spring forms a single dynamic unit with the leaf spring assembly and improves spring load characteristics, wherein, the third stage reinforcing spring acting as a pre-loader of the leaf spring assembly by pulling at least one end of the leaf spring assembly upwardly.

13. A reinforcing spring for a leaf spring system having a plurality of leaf springs each having ends that curve in an upward direction from a lower portion to an upper portion of the leaf spring system, the reinforcing spring comprising:

a preformed curved body portion, having a greater curvature than that of the leaf spring system, a first end and a second end wherein the first end and second end are unsymmetrical;

an enclosing or cupping feature for pivotal connection of the first end;

a first attachment mechanism connectable around the leaf spring system to provide pivotal connection of the first end of the preformed curved body portion to the first attachment mechanism at a spaced position from an inside radius of the leaf spring system and for allowing relative movement of the preformed curved body portion in a forward and backward motion along the inside radius of the leaf spring system and in a longitudinal direction of the leaf spring system, wherein the first attachment mechanism comprises a shackle with at least two of a plurality of plates, a first connector for fastening the plates to each side of the first end and for pivotal connection with the first end via the enclosing or cupping feature, and a spaced second connector for mounting beneath at least one leaf of the leaf spring system for facilitating sliding and support of the at least one leaf of the leaf spring system, wherein the first connector includes a pin, bolt or screw, and the second connector includes a pin, bolt or screw, and a bush or tube for receiving the pin, bolt or screw, wherein each of the first end and the second end curves away from the leaf spring system, wherein the reinforcing spring is secured on the inside radius of the leaf spring system when the leaf spring system is in a resting state; and a second attachment mechanism fixedly attachable to the leaf spring system and holding the second end of the preformed curved body portion in a fixed state, wherein the first attachment mechanism provides for high tension at the first end, and the second attachment mechanism provides for low tension at the second end to provide a dynamic unit with the leaf spring system and improves spring load characteristics.

* * * * *